(12) United States Patent
Yamada et al.

(10) Patent No.: US 11,623,864 B2
(45) Date of Patent: Apr. 11, 2023

(54) METHOD FOR PRODUCING SOLID ELECTROLYTE

(71) Applicant: IDEMITSU KOSAN CO., LTD., Chiyoda-ku (JP)

(72) Inventors: Hiroaki Yamada, Sodegaura (JP); Hironari Kimpara, Sodegaura (JP); Shota Totsuka, Sodegaura (JP); Atsushi Sato, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 255 days.

(21) Appl. No.: 16/986,335

(22) Filed: Aug. 6, 2020

(65) Prior Publication Data

US 2021/0284534 A1    Sep. 16, 2021

(30) Foreign Application Priority Data

Aug. 9, 2019  (JP) .............................. JP2019-147733

(51) Int. Cl.
| | |
|---|---|
| *H01M 4/02* | (2006.01) |
| *C01B 17/38* | (2006.01) |
| *H01M 10/0562* | (2010.01) |
| *H01M 10/058* | (2010.01) |

(52) U.S. Cl.
CPC ........... *C01B 17/38* (2013.01); *H01M 10/058* (2013.01); *H01M 10/0562* (2013.01); *C01P 2002/74* (2013.01); *C01P 2004/03* (2013.01); *C01P 2004/62* (2013.01); *C01P 2006/12* (2013.01); *C01P 2006/40* (2013.01); *H01M 2300/0068* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 2018/0090787 A1* | 3/2018 | Makino | H01M 4/622 |
| 2018/0358653 A1* | 12/2018 | Maruyama | H01M 10/0525 |
| 2019/0173127 A1* | 6/2019 | Jang | H01M 10/0562 |
| 2019/0312304 A1 | 10/2019 | Uesugi et al. | |

FOREIGN PATENT DOCUMENTS

| | | |
|---|---|---|
| JP | 2014-086373 A | 5/2014 |
| JP | 2015-56333 | 3/2015 |
| JP | 2018-067552 A | 4/2018 |
| WO | 2017/018456 | 2/2017 |
| WO | 2019/031436 | 2/2019 |

OTHER PUBLICATIONS

Office Action dated Dec. 13. 2022. in Japanese Patent Application No. 2019-147733 (with English-language Translation).

* cited by examiner

*Primary Examiner* — Jacob B Marks
(74) *Attorney, Agent, or Firm* — Oblon, McClelland, Maier & Neustadt, L.L.P.

(57) ABSTRACT

A method of production of a solid electrolyte, which comprises:
 a step of obtaining a mixture comprising a sulfide solid electrolyte and a tertiary alcohol including 9 or less carbon atoms, and
 a step of removing the tertiary alcohol from the mixture.

10 Claims, 1 Drawing Sheet

METHOD FOR PRODUCING SOLID ELECTROLYTE

TECHNICAL FIELD

Embodiments described in the specification relates generally to a method of production of a solid electrolyte.

BACKGROUND ART

A sulfide solid electrolyte is known to be degraded due to airborne moisture. For example, Patent Document 1 discloses a solid electrolyte in which a surface of a core compound having an argyrodite-type crystal structure is coated with a surface compound having another crystal structure. In addition, Patent Document 2 discloses formation of a solid electrolyte layer or the like by applying a paste of a solid electrolyte which contains a tertiary alcohol.

RELATED ART DOCUMENTS

Patent Documents

[Patent Document 1] JP 2018-67552 A
[Patent Document 2] JP 2014-86373 A

SUMMARY OF THE INVENTION

As in Patent Document 1, in order to coat the core compound with the surface compound, the core compound and the raw material of the surface compound have to be mixed and heated, and the production process becomes complicated.

An object of the invention is to produce a solid electrolyte with suppressed generation of hydrogen sulfide by a simple method.

According to one embodiment of the invention, a method of production of a solid electrolyte, which includes: a step of obtaining a mixture containing a sulfide solid electrolyte and a tertiary alcohol including 9 or less carbon atoms, and a step of removing the tertiary alcohol from the mixture.

According to one embodiment of the invention, it is possible to provide a simple method of production of a sulfide solid electrolyte in which the generation of hydrogen sulfide is suppressed.

MODE FOR CARRYING OUT THE INVENTION

Figure 1:
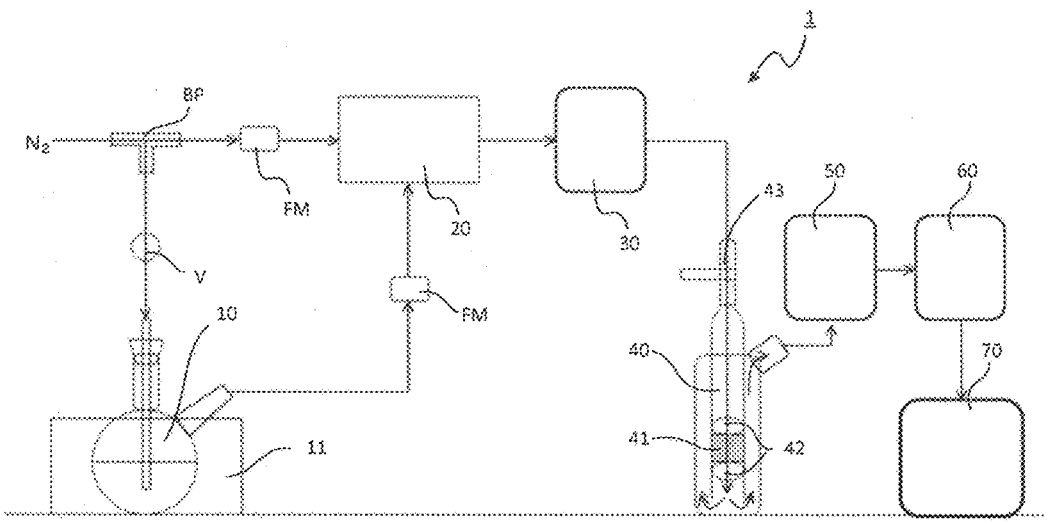
FIG. 1 is a schematic configuration diagram of a test apparatus for measuring the amount of hydrogen sulfide generated.

A method of production of a solid electrolyte according to one embodiment of the invention includes a step of obtaining a mixture containing a sulfide solid electrolyte and a tertiary alcohol including 9 or less carbon atoms, and a step of removing the tertiary alcohol from the mixture. By contacting the sulfide solid electrolyte with the tertiary alcohol including 9 or less carbon atoms, the specific surface area of the sulfide solid electrolyte increases and the surface is modified, thereby suppressing the generation of hydrogen sulfide. Since the generation of hydrogen sulfide is suppressed even though the specific surface area increases, it is presumed that some kind of coating is formed. Thus, it is possible to suppress the generation of hydrogen sulfide from the solid electrolyte. There is also the advantage that a larger specific surface area of the solid electrolyte facilitates the formation of a contact interface between an active material and the solid electrolyte, for example, and ion conduction at the interface is improved.

The sulfide solid electrolyte used in the embodiment is not particularly limited, and a known sulfide solid electrolyte can be employed. The sulfide solid electrolyte may be amorphous (glass) or have a crystal structure. Examples of the sulfide solid electrolyte having a crystal structure include an argyrodite-type crystal structure, a $Li_3PS_4$ crystal structure, a $Li_4P_2S_6$ crystal structure, a $Li_7P_3S_{11}$ crystal structure, and a $Li_{4-x}Ge_{1-x}P_xS_4$-based thio-LISICON Region II type crystal structure, and a crystal structure similar to the $Li_{4-x}Ge_{1-x}P_xS_4$-based thio-LISICON Region II type crystal structure (hereinafter, sometimes abbreviated as an RII type crystal structure). Note that the sulfide solid electrolyte may have an amorphous component as a part thereof.

In one embodiment, a sulfide solid electrolyte is preferably a sulfide solid electrolyte having an argyrodite-type crystal structure (hereinafter, sometimes referred to as an argyrodite-type solid electrolyte). The argyrodite-type solid electrolyte is not particularly limited. An argyrodite-type crystal structure can be confirmed by having diffraction peaks at $2\theta=25.2\pm0.5$ deg and $29.7\pm0.5$ deg in powder X-ray diffraction measurements using CuKα rays. The diffractive peaks are peaks derived from the argyrodite-type crystal structure. Diffractive peaks of the argyrodite-type crystal structure may also appear, for example, at $2\theta=15.3\pm0.5$ deg, $17.7\pm0.5$ deg, $31.1\pm0.5$ deg, $44.9\pm0.5$ deg, and $47.7\pm0.5$ deg. The argyrodite-type solid electrolyte may have these peaks.

Examples of the argyrodite-type solid electrolyte may include, for example, solid electrolytes disclosed in WO2015/011937, WO2015/012042, JP2016-24874, WO2016/104702, JP2010-540396, JP2011-096630, and JP2013-211171.

Examples of the compositional formulas include, for example, $Li_6PS_5X$, $Li_{7-x}PS_{6-x}X_x$ (X=Cl, Br, I; x=0.0 to 1.8).

The argyrodite-type solid electrolyte may contain an amorphous component as a part thereof as long as it has X-ray diffraction patterns of the above-mentioned argyrodite-type crystal structure. The amorphous component indicates a halo pattern in which the X-ray diffraction pattern does not indicate peaks other than a peak substantially derived from the raw material in the X-ray diffraction measurement. Moreover, the argyrodite-type solid electrolyte may contain crystal structures other than the argyrodite-type crystal structure, and other raw materials.

As the tertiary alcohol including 9 or less carbon atoms, an alkyl alcohol is preferred. For example, t-butyl alcohol, t-amyl alcohol, 2-methyl-pentanol, 3-methyl-3-pentanol can be used. Among these, a tertiary alcohol including 5 or more carbon atoms is preferred. Preferred are t-amyl alcohol, 2-methyl-pentanol, 3-methyl-3-pentanol, and t-amyl alcohol is further preferred. Since the alcohol hardly remains in the sulfide solid electrolyte in the case where an alcohol including 9 or less carbon atoms is used, a decrease in ionic conductivity can be prevented. In addition, among alcohols having good contacts with the sulfide solid electrolyte, tertiary alcohols hardly deteriorate the solid electrolyte.

A method for mixing a tertiary alcohol including 9 or less carbon atoms (hereinafter, sometimes referred to as a tertiary alcohol) and a sulfide solid electrolyte are not particularly limited and examples thereof include known stirring means, such as a reaction vessel with a stirring blade; and pulverizers such as a planetary ball mill, a vibrating mill, a rolling mill, and a bead mill. The mixing time can be appropriately adjusted depending on the device used. Normally, the mixing time is about 0.5 to 5 hours. From the viewpoint of modifying the tertiary alcohol and the sulfide solid electrolyte by making them more contact with each other, mixing by pulverizer is preferred.

There is no particular limitation on the amount of the sulfide solid electrolyte in the mixture as long as the tertiary alcohol can sufficiently contact with the surface of sulfide solid electrolyte particles. Normally, the amount of the sulfide solid electrolyte is 1 to 99 mass % based on the sum of the sulfide solid electrolyte and the tertiary alcohol.

In one embodiment, in addition to the sulfide solid electrolyte and the tertiary alcohol, a nonpolar solvent, a nitrile compound and an ether compound, which will be described later, may be blended to such an extent that the effect of the invention is not impaired.

By the above mixing, for example, a slurry-like mixture in which the sulfide solid electrolyte is dispersed in the tertiary alcohol is obtained. By removing the tertiary alcohol from the mixture, a solid electrolyte is obtained. There is no particular limitation on the method for removing the tertiary alcohol, and a known method can be employed. For example, the mixture is treated by vacuum-drying at room temperature for 2 hours, and treated at 100° C. for 2 hours to remove the tertiary alcohol from the mixture, thereby a dry powdery solid electrolyte can be collected.

The solid electrolyte produced in the embodiment can have a suppressed generation of hydrogen sulfide from the sulfide solid electrolyte and also suppress the decrease in the ionic conductivity of the sulfide solid electrolyte. In addition, the surface area of the sulfide solid electrolyte is increased.

According to one embodiment, a sulfide solid electrolyte obtained by a method of production having a step of using a solvent and removing the solvent can be used as the sulfide solid electrolyte. For example, starting materials of a sulfide solid electrolyte such as lithium sulfide, phosphorus sulfide, and lithium halide are mixed and pulverized in a solvent, and the obtained raw material mixture is heated to obtain a calcined product, and the calcined product is fired whereby a sulfide solid electrolyte is obtained.

Further, a sulfide solid electrolyte can be obtained by heating and calcining the raw material mixture in a solvent, followed by firing the obtained calcined product.

As the solvent, an organic solvent can be used, and preferably, a nonpolar solvent, a polar solvent, or a mixed solvent thereof can be used. Preferably, the solvent is a nonpolar solvent, or a solvent containing a nonpolar solvent as a main component, for example, a solvent in which 95 mass % or more of the total organic solvent is a nonpolar solvent.

As the nonpolar solvent, a hydrocarbon-based solvent is preferable. As the hydrocarbon-based solvent, a saturated hydrocarbon, an unsaturated hydrocarbon, or an aromatic hydrocarbon can be used.

Examples of the saturated hydrocarbon include hexane, pentane, 2-ethylhexane, heptane, decane, tridecane, cyclohexane, and the like.

Examples of the unsaturated hydrocarbon include hexene, heptene, cyclohexene, and the like.

Examples of the aromatic hydrocarbon include toluene, xylene, ethylbenzene, decalin, 1,2,3,4-tetrahydronaphthalene, and the like.

Among these, toluene or xylene is preferable.

The hydrocarbon-based solvent is preferably dehydrated in advance. Specifically, the moisture content is preferably 100 ppm by mass or less, particularly preferably 30 ppm by mass or less.

In one embodiment, it is preferable that the organic solvent contains at least one of a nitrile compound and an ether compound.

Examples of the ether compound include tetrahydrofuran, diethyl ether, and the like.

As the nitrile compound, a nitrile compound represented by $R(CN)_n$ is preferable. In the formula, R is an alkyl group including 1 or more and 10 or less carbon atoms, or a group containing an aromatic ring including 6 or more and 18 or less ring carbon atoms. n is 1 or 2.

Examples include acetonitrile, propionitrile, 3-chloropropionitrile, benzonitrile, 4-fluorobenzonitrile, tertiary butyronitrile, isobutyronitrile, cycbhexylnitrile, capronitrile, isocapronitrile, malononitrile, and fumaronitrile. Propionitrile, isocapronitrile and isobutyronitrile are preferable.

For example, a nitrile compound is preferable because it is azeotropic with toluene and can be easily removed with toluene from the treated product at the time of drying.

The amount of the nitrile compound and the ether compound contained in the organic solvent is preferably 0.01 to 5 mass %, more preferably 0.1 to 3 mass %, and particularly preferably 0.3 to 1 mass %.

For mixing and pulverizing, for example, a pulverizer such as a planetary ball mill, a vibration mill, a rolling mill, or a bead mill; or a kneader such as a uniaxial kneader or a multiaxial kneader can be used.

The raw material mixture obtained by removing a solvent from the treated product after mixing and pulverizing is mainly composed of fine crystals. By mixing and pulverizing the raw material, a particle-fining of the raw material proceeds, and a raw material mixture composed of fine crystals of each raw material is obtained.

By calcining the raw material mixture, a calcined product is obtained. In one embodiment, a raw material mixture is obtained by removing a solvent as described above, and then calcined, so that a powdery calcined product is obtained. The heating temperature and the heating time in the calcination can be appropriately adjusted in consideration of the composition of the calcined product and the like. For example, the heating temperature is preferably 150° C. to 300° C., more preferably 160° C. to 280° C., and particularly preferably 170° C. to 250° C. The heating time is preferably 0.1 to 8 hours, more preferably 0.2 to 6 hours, and particularly preferably 0.25 to 4 hours.

The heating device used in the calcination is not particularly limited. Examples thereof include sharing-type dryers such as a FM-mixer, and a Nauta Mixer, stationary furnaces such as a hearth kiln, and rotating-type furnaces such as a rotary kiln. Note that drying may be performed before calcination, and drying and calcination may be performed simultaneously. The atmosphere of the calcination is not particularly limited, and is preferably an inert gas atmosphere such as nitrogen or argon.

A sulfide solid electrolyte is obtained by firing the calcined product. The heating temperature and the heating time in the firing can be appropriately adjusted in consideration of the composition of the calcined product and the like. For example, in the case of argyrodite-type solid electrolyte, the heating temperature is preferably 300° C. to 470° C., more preferably more than 300° C. and 460° C. or less, more preferably 320° C. to 450° C., still more preferably 350° C. to 440° C., and particularly preferably 380° C. to 430° C.

The heating time is preferably 1 to 360 minutes, more preferably 5 to 120 minutes, and particularly preferably 10 to 60 minutes.

The atmosphere at the time of heating is not particularly limited, and is preferably an atmosphere not under hydrogen sulfide airflow but under an inert gas such as nitrogen, argon, or the like. For the firing step, a firing furnace such as a hearth kiln of a stationary-type or a rotary kiln of a rotating-type can be used.

In the case where the raw material mixture is calcined in a solvent, as a solvent used for the calcination, a nonpolar solvent, a polar solvent or a mixed solvent thereof described above can be used. Heating is performed on a slurry in which a raw material mixture is dispersed in a solvent. The solvent used for the calcination may be the same or different solvent used in mixing or the like of the raw material. The use of the same solvent is preferable because a step of removing the solvent is not needed.

The heating temperature and the heating time in the calcination can be appropriately adjusted in consideration of the composition of the raw material and the like. For example, the heating temperature is preferably 150° C. to 300° C., more preferably 160° C. to 280° C., still more preferably 170° C. to 270° C., and particularly preferably 180° C. to 260° C. By setting the temperature within the above range, a $PS_4$ structure is formed, and halogen is easily incorporated into the crystal. Since the raw material mixture of fine crystals are calcined in the solution, crystals containing $PS_4$ structure can be formed at a relatively low temperature.

The heating time is preferably 10 minutes to 6 hours, more preferably 10 minutes to 3 hours, and particularly preferably 30 minutes to 2 hours.

The heating device used in the calcination is not particularly limited, and it is preferable to use an autoclave when the heating temperature exceeds the boiling point of the solvent used.

The calcined product is collected by removing the solvent from the slurry used for the calcination. The method for removing the solvent is not particularly limited, and the solvent can be distilled off under a normal pressure or a reduced pressure. Filtration can also be used in combination for greater productivity.

A sulfide solid electrolyte is obtained by firing the calcined product.

In the embodiment, a mature containing a sulfide solid electrolyte and a tertiary alcohol may further contain a solvent used for producing the sulfide solid electrolyte.

EXAMPLES

The invention is described below in more detail with reference to Examples.

The evaluation methods are as follows.

(1) Ionic Conductivity Measurement

A sample was filled in a tablet molding machine, and a molded body was formed by applying a pressure of 22 MPa to the sample. Carbon was placed on both sides of the molded body as electrodes, and pressure was applied again thereto by a tablet molding machine, whereby a molded body for the measurement (diameter about 10 mm, thickness: 0.1 to 0.2 cm) was prepared. The ionic conductivity of this molded body was measured by AC impedance measurement. The conductivity value at 25° C. was adopted.

(2) Generation Amount of Hydrogen Sulfide

FIG. 1 shows a schematic configuration diagram of a test apparatus.

The test apparatus 1 includes a flask 10 for humidifying nitrogen, a static mixer 20 for mixing the humidified nitrogen and non-humidified nitrogen, a dew-point meter 30 (M170/DMT152, manufactured by VAISALA CORPORATION) for measuring the moisture in the mixed nitrogen, a double reaction tube 40 in which a measurement sample is installed, a dew-point meter 50 for measuring the moisture in the nitrogen discharged from the double reaction tube 40, and a hydrogen sulfide measuring instrument 60 (Model 3000 RS, manufactured by AMI COMPANY) for measuring the concentration of hydrogen sulfide contained in the discharged nitrogen as the main components, and these components are connected by tubes (not shown). The temperature of the flask 10 is set to 10° C. by the cooling tank 11.

A teflon tube having a diameter of 6 mm was used as the tubes for connecting between the components. In this figure, the tubes are omitted, and the flow of nitrogen is indicated by arrows instead.

The evaluation procedure was as follows.

In a glove box filled with nitrogen having a dew-point of −80° C., about 0.15 g of a powdery sample 41 was weighed, and placed inside the double reaction tube 40 so as to be sandwiched between quartz wools 42, and the double reaction tube 40 was sealed. Note that the temperature inside the double reaction tube 40 was held at about room temperature (25° C.).

Nitrogen was supplied into the apparatus 1 from a nitrogen source (not shown) at 0.02 MPa. The supplied nitrogen passes through the biforked branch pipe BP, and a part of the nitrogen is supplied to the flask 10 and is humidified. The others are supplied directly to the static mixer 20 as the non-humidified nitrogen. Note that the amount of nitrogen supplied to the flask 10 is adjusted by means of a needle valve V.

The dew-point is controlled by adjusting the flow rates of the non-humidified nitrogen and the humidified nitrogen with a flow meter FM with a needle valve. Specifically, the non-humidified nitrogen was supplied to the static mixer 20 at a flow rate of 800 mL/min, and the humidified nitrogen was supplied to the same at a flow rate of 10 to 30 mL/min, and both the nitrogen were mixed to confirm the dew-point of the mixed gas (a mixture of the non-humidified nitrogen and the humidified nitrogen) by means of the dew-point meter 30.

After the dew-point was adjusted to −30° C., the three-way cock 43 was rotated to allow the mixed gas to flow through the double reaction tube 40 for 2 hours. The amount of hydrogen sulfide contained in the mixed gas that has passed through the sample 41 was measured by hydrogen sulfide measuring instrument 60, and the amount of hydrogen sulfide generated per 1 g of the solid electrolyte (cc/g) was calculated. The amount of hydrogen sulfide was recorded at intervals of 15 seconds. Further, for reference, the dew-point of the mixed gas after exposure to the sample was measured by means of the dew-point meter 50. The post-measurement nitrogen was passed through an alkaline trap 70 to remove hydrogen sulfide.

(3) BET Specific Surface Area

The BET specific surface area was measured by a nitrogen method using a gas adsorption amount measuring instrument (AUTOSORB6, manufactured by Sysmex Corporation).

(4) Amount of Residual Solvent

The amount of a residual solvent was measured by gas chromatography (type 6890, manufactured by Agilent Technologies).

(5) Mean Particle Size (Volume Basis Mean Particle Size d50)

The mean particle size was measured with a laser diffraction/scattering type particle size distribution measurement device (LA-950V2 model LA-950M, manufactured by HORIBA Ltd.).

A mixture of dehydrated toluene (manufactured by Wako Pure Chemical Industries, Ltd., special grade) and tertiary butyl alcohol (manufactured by Wako Pure Chemical Industries, Ltd., special grade) at a weight ratio of 93.8:6.2 was used as a disperse medium. Into a flow cell of the device, 50 mL of the disperse medium was poured and circulated. Thereafter, a sample to be measured was added to the disperse medium, followed by ultrasonic treatment, and then particle size distribution was measured. The addition amount of the measurement sample was adjusted so that the red-light transmittance (R) corresponding to the particle concentration was 80 to 90% and the blue-light transmittance (B) corresponding to the particle concentration was 70 to 90% on the measurement screen defined by the device. The calculation conditions used were 2.16 as the value of the refractive index of the measurement sample and 1.49 as the value of the refractive index of the disperse medium, respectively. In the setting of the distribution form, the particle size calculation was performed with the fixed number of repetitions to 15 times.

Production Example 1

(1) Production of Lithium Sulfide ($Li_2S$)

As a nonaqueous medium, 303.8 kg of toluene (manufactured by Sumitomo Corporation) which was dehydrated and had a moisture content of 100 ppm when measured by a Karl Fischer moisture meter was added to a 500 L stainless-steel reaction kiln under nitrogen airflow. Then, 33.8 kg of anhydrous lithium hydroxide (manufactured by Honjo Chemical Co., Ltd.) was put in the reaction kiln, and the slurry was kept at 95° C. while being stirred with a twin star stirring blade at 131 rpm.

Hydrogen sulfide (manufactured by Sumitomo Seika Co., Ltd.) was blown into the slurry at a feed rate of 100 L/min, and the temperature was raised to 104° C. An azeotropic gas of water and toluene was continuously discharged from the reaction kiln. This azeotropic gas was condensed by an out-of-system condenser to achieve dehydration. In the meantime, the same amount of toluene as distilling toluene was continuously supplied to the reaction kiln, and the reaction liquid level was maintained in constant.

The moisture content in the condensate gradually decreased, and no distillation of water was observed 24 hours after the introduction of hydrogen sulfide. During the reaction, the reaction liquid was in a state where the solid was dispersed in toluene and stirred, and there was no moisture separated from toluene.

After that, hydrogen sulfide was switched to nitrogen and flowed at 100 L/min for 1 hour.

The obtained solid was collected by filtration and dried to obtain $Li_2S$ as a white powder.

(2) Production of Argyrodite-Type Solid Electrolyte (Sulfide Solid Electrolyte)

(A) Pulverizing Step $Li_2S$ obtained in the above (1) was pulverized under a nitrogen atmosphere using a pin mill (100UPZ, manufactured by Hosokawa Micron Corporation) equipped with a fixed quantity supplier. The input rate was 80 g/min, and the rotation speed of the disc was 18000 rpm.

Similarly, $P_2S_5$, LiBr (manufactured by Honjo Chemical Co., Ltd.) and LiCl (manufactured by Honjo Chemical Co, Ltd.) were respectively pulverized using a pin mill. $P_2S_5$ input rate was 140 g/min, LiBr input rate was 230 g/min, and LiCl input rate was 250 g/min. The rotation speed of each disk was 18000 rpm.

(B) Preparation of the Raw Material Mixture

In a nitrogen atmosphere glove box, each compound pulverized in the above (A) was weighed so that the molar ratio was $Li_2S:P_2S_5:LiBr:LiCl=47.5:12.5:15.0:25.0$, and a total amount of the compounds was 110 g. The compounds were put into a glass vessel, and coarsely mixed by shaking the vessel.

110 g of the crude mixed raw material was dispersed in a mixed solvent of 1140 mL of dehydrated toluene (manufactured by Wako Pure Chemical Industries, Ltd.) and 7 mL of dehydrated isobutyronitrile (manufactured by KISHIDA CHEMICAL Co., Ltd.) under a nitrogen atmosphere to obtain a slurry of about 10 wt %. The slurry was mixed and pulverized using a bead mill (LMZ015, manufactured by Ashizawa Finetech Ltd.) while maintaining the slurry under a nitrogen atmosphere. Specifically, 456 g of zirconia beads having a diameter of 0.5 mm were used as the pulverizing medium, and the bead mill was operated under the conditions of a peripheral speed of 12 m/s and a flow rate of 500 mL/min. The slurry was put into the mill and circulated for 1 hour. The treated slurry was placed in a nitrogen-substituted Schlenk bottle, and then dried under reduced pressure to prepare a raw material mixture.

(C) Calcinating Step 30 g of the raw material mixture obtained in the above (B) was dispersed in 300 mL of ethylbenzene (manufactured by Wako Pure Chemical Industries, Ltd.) to obtain a slurry. This slurry was put into an autoclave (capacity: 1000 mL, made of SUS316) equipped with a stirrer and an oil bath for heating, and the slurry was heat-treated at 200° C. for 2 hours while stirring at a rotational speed of 200 rpm. After the treatment, the slurry was dried under a reduced pressure, and the solvent was distilled off to obtain a calcined product.

(D) Firing Step

The calcined product obtained in the above (C) was heated in an electric furnace (F-1404-A, manufactured by Tokyo Garasu Kkai Co., Ltd.) in a nitrogen atmosphere glove box. Specifically, a sagger made of $Al_2O_3$ (999-60S, manufactured by Tokyo Garasu Kkai Co., Ltd.) was placed in the electric furnace, and the temperature was raised from room temperature to 380° C. in 1 hour and held at 380° C. for 1 hour or more. Thereafter, the door of the electric furnace was opened, the calcined product was quickly poured into the sagger, and then the door was immediately closed and heated for 1 hour. Thereafter, the sagger was taken out of the electric furnace and slowly cooled to obtain an argyrodite-type solid electrolyte.

(E) Finely Pulverizing Step

The obtained argyrodite-type solid electrolyte was dispersed in a mixed solvent of dehydrated toluene (manufactured by Wako Pure Chemical Industries, Ltd.) and dehydrated isobutyronitrile (manufactured by KISHIDA CHEMICAL Co., Ltd.) under a nitrogen atmosphere to obtain a slurry of about 8 wt %. The slurry was mixed and pulverized using a bead mill (LMZ015, manufactured by Ashizawa Finetech Ltd.) while maintaining the slurry in a nitrogen atmosphere. The treated slurry was placed in a nitrogen-substituted Schlenk bottle, and then dried under reduced pressure to obtain a finely pulverized argyrodite-type solid electrolyte.

As a result of X-ray diffraction (XRD) measurements, peaks derived from an argyrodite-type crystal structure were observed in the XRD patterns at 2θ=25.5±1.0 deg and 29.9±1.0 deg, etc.

d50 was 0.6 μm. Ionic conductivity was 4.6 mS/cm.

Figure 2:
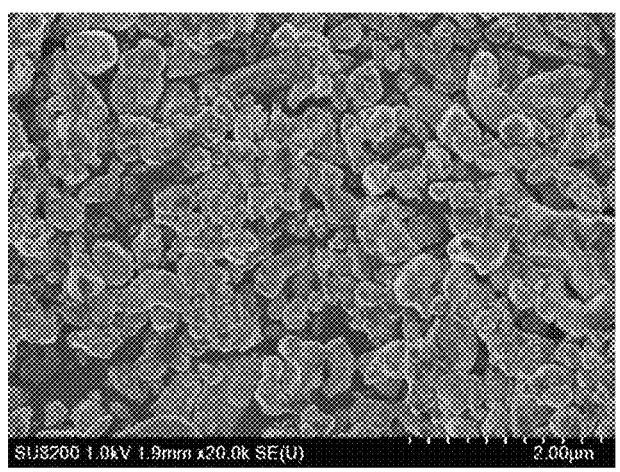
FIG. 2 is a SEM-photograph of an argyrodite-type solid electrolyte obtained in Production Example 1.

A SEM-photograph of the argyrodite-type solid electrolyte is shown in FIG. 2.

Example 1

Under a nitrogen atmosphere, 1.0 g of the argyrodite-type solid electrolyte obtained in Production Example 1 and 10 mL of t-amyl alcohol (manufactured by FUJIFILM Wako Pure Chemical Corporation, water content 10 ppm or less) were put into a 50 mL Schlenk bottle to obtain a mixture. A stirrer tip was put into the mixture and stirred at room temperature for 1 hours while keeping the mixture under the nitrogen atmosphere. Thereafter, a dried powder was obtained by removing the solvent by vacuum drying at room temperature for 2 hours. The resulting dry powder was vacuum-dried at 100° C. for 2 hours to obtain a solid electrolyte.

Ionic conductivity was 4.0 mS/cm.

Figure 3:
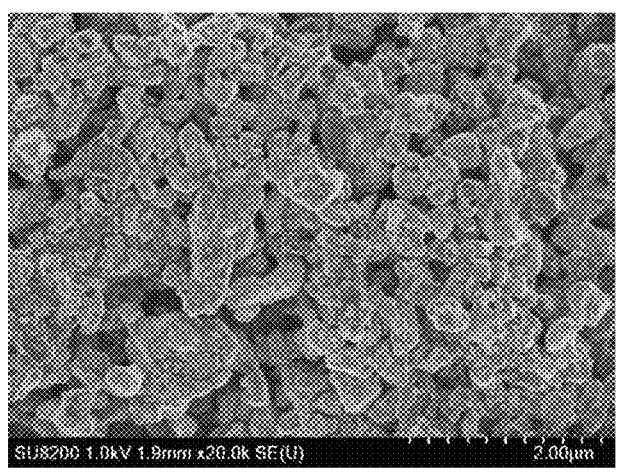
FIG. 3 is a SEM-photograph of a solid electrolyte obtained in Example 1.

The results of the evaluation of the amount of hydrogen sulfide generated, BET specific surface area, and the amount of hydrogen sulfide generated per surface area of the solid electrolyte are shown in Table 1. A SEM-photograph of the solid electrolyte is shown in FIG. 3.

The mean particle size was 0.5 μm. Note that the residual solvents in the solid electrolyte were in an amount of less than 0.1 wt % for toluene and isobutyronitrile, respectively, and 8.3 wt % for t-amyl alcohol.

Comparative Example 1

A solid electrolyte was produced and evaluated in the same manner as in Example 1, except that 10 mL of toluene (manufactured by FUJIFILM Wako Pure Chemical Corporation, water content: 10 ppm or less) was used as the solvent Ionic conductivity of the solid electrolyte obtained by the solvent-treatment was 3.7 mS/cm. The results are shown in Table 1.

Comparative Example 2

A solid electrolyte was produced and evaluated in the same manner as in Example 1, except that 1.5 g of the argyrodite-type solid electrolyte was used and a mixed solvent of 16 mL of toluene and 0.01 mL of isopropyl alcohol (manufactured by FUJIFILM Wako Pure Chemical Corporation) was used as the solvent Ionic conductivity of the solid electrolyte obtained by the solvent-treatment was 4.2 mS/cm. The results are shown in Table 1.

Comparative Example 3

The argyrodite-type solid electrolyte obtained in Production Example 1 was evaluated. The results are shown in Table 1.

TABLE 1

| | Solvent | Generation amount of $H_2S$ [cc/g] | BET specific surface area [$m^2$/g] | Generation amount of HS/BET specific surface area [cc/$m^2$] |
|---|---|---|---|---|
| Example 1 | TAA | 9.6 | 35 | 0.3 |
| Comp. Ex. 1 | Tol | 12.6 | 15 | 0.8 |
| Comp. Ex. 2 | IPA + Tol | 12.5 | 20 | 0.6 |
| Comp. Ex. 3 | | 14.2 | 14 | 1.0 |

In Table 1, TAA means t-amyl alcohol, Tol means toluene, and IPA means isopropyl alcohol.

From the results shown in Table 1, it can be seen that in Example 1 in which t-amyl alcohol (TAA) is used as a solvent, the amount of hydrogen sulfide generated can be reduced. Further, the specific surface area became large, and the amount of hydrogen sulfide generated per surface area became extremely small. In other words, with the solid electrolyte of Example 1, it is possible to enhance the contact between the active material and the solid electrolyte, thereby improving ionic conductivity at the interface and suppressing the generation of hydrogen sulfide.

On the other hand, in Comparative Examples 1 and 2 using other solvents, although the amount of hydrogen sulfide generated is reduced, but not as much as in Example 1. The differences to Example 1 in the amount of hydrogen sulfide generated per surface area are remarkable. From the SEM-photographs of FIGS. 2 and 3, in Example 1 treated with a tertiary alcohol, it can be confirmed that fine irregularities are occurred on the surface, and the specific surface area is increased.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method of production of a solid electrolyte, which comprises:
   a step of obtaining a mixture comprising a sulfide solid electrolyte and a tertiary alcohol including 9 or less carbon atoms, and
   a step of removing the tertiary alcohol from the mixture.

2. The method of production according to claim 1, wherein the tertiary alcohol is one including 5 or more carbon atoms.

3. The method of production according to claim 1, wherein the tertiary alcohol is an alkyl alcohol.

4. The method of production according to claim 1, wherein the tertiary alcohol is t-amyl alcohol.

5. The method of production according to claim 1, wherein in the step of obtaining the mixture, a pulverizer is used.

6. The method of production according to claim 1, wherein a sulfide solid electrolyte obtained by a method comprising a step of using a solvent, and removing the solvent is used as the sulfide solid electrolyte.

7. The method of production according to claim 6, wherein the mixture further comprises the solvent.

8. The method of production according to claim 1, wherein powdery solid electrolyte is obtained.

9. The method of production according to claim 1, wherein the sulfide solid electrolyte has a crystal structure.

10. The method of production according to claim 1, wherein the sulfide solid electrolyte has an argyrodite-type crystal structure.

* * * * *